Nov. 15, 1938.   J. W. FREE   2,136,772
APPARATUS FOR WELDING
Filed Dec. 9, 1936   2 Sheets-Sheet 1

INVENTOR
John W. Free.
by his attorneys
Stebbins, Blenko & Parmelee

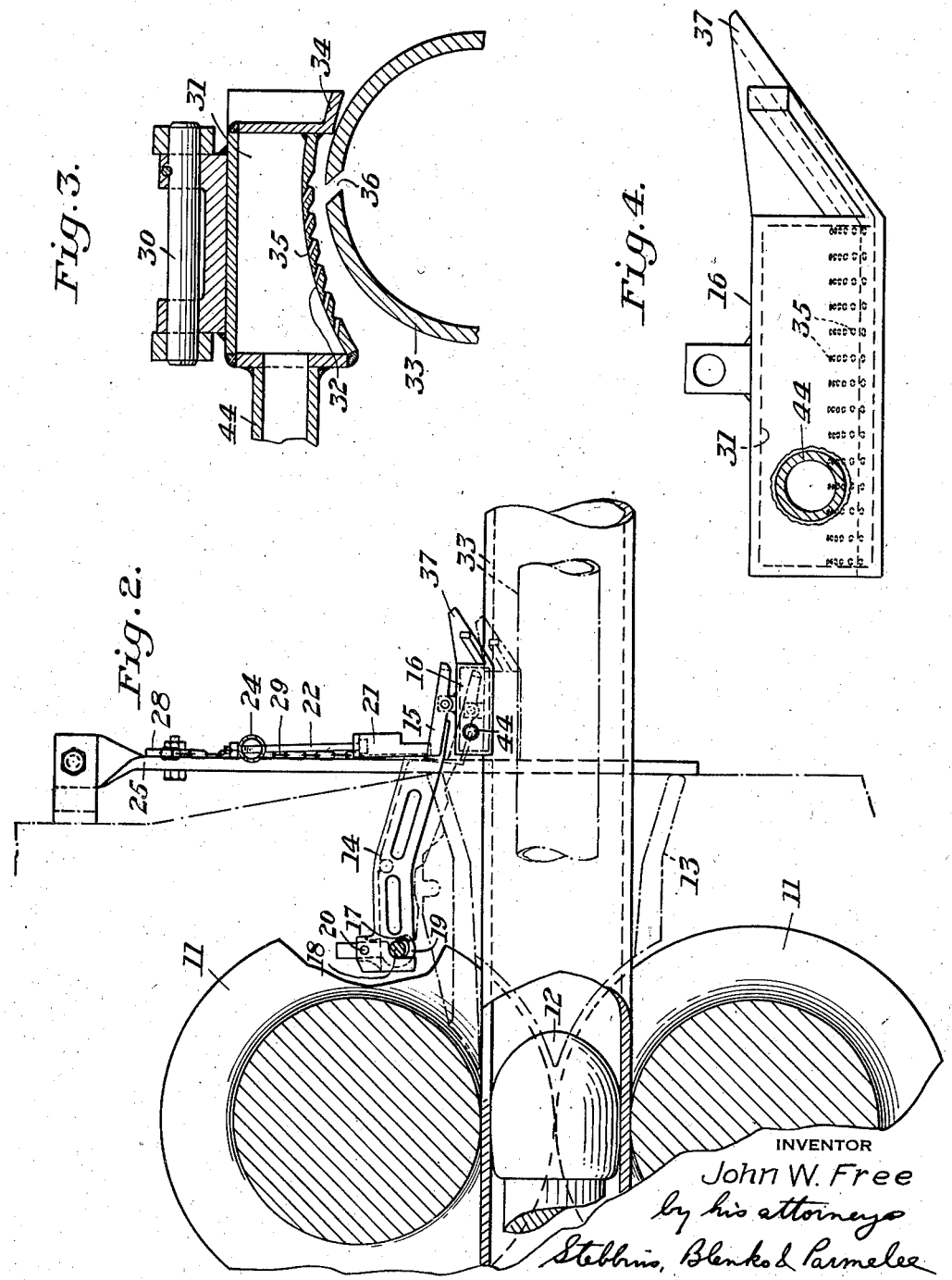

Patented Nov. 15, 1938

2,136,772

UNITED STATES PATENT OFFICE 2,136,772

APPARATUS FOR WELDING

John W. Free, Aliquippa, Pa., assignor to Jones & Laughlin Steel Corporation, Pittsburgh, Pa., a corporation of Pennsylvania Application December 9, 1936, Serial No. 114,969

6 Claims. (Cl. 78—83)

This invention relates to welding and, particularly, to an apparatus for directing a stream of a suitable gas, such as oxygen or air, onto heated plate edges just prior to welding them together.

It has long been known that a blast of air or oxygen directed onto heated edges just prior to welding them facilitates the welding and makes it possible to weld at a lower temperature, reducing the hazard of overheating or burning. Attempts have been made to utilize this principle in the manufacture of lap-weld pipe, but such attempts have not been uniformly successful. It is an object of the invention, therefore, to improve upon prior apparatus for applying the gas blast to the edges to be welded.

In accordance with the invention, I provide a shoe or head adapted to be disposed closely adjacent the edges to be welded as they advance to the point at which welding is effected. The shoe or head is movably supported and includes a chamber having perforations spaced longitudinally and transversely thereof, and so directed as to create gas jets in a direction perpendicular to the edges to be joined. The shoe is connected to a suitable source of gas. The invention is particularly adapted to the manufacture of lap-weld pipe, and will be described with reference to that application, although other uses therefor will occur to those skilled in the art.

The details of the construction and operation of the invention may be gathered from the following description thereof which is to be read in connection with the accompanying drawings illustrating a present preferred embodiment and practice. In the drawings, Fig. 1 is an elevation of the invention applied to the welding stand of a conventional lap-weld pipe mill, the pipe itself being shown in section and the welding stand being shown in chain lines with parts omitted;

Fig. 2 is a sectional view along the line II—II of Fig. 1;

Fig. 3 is a partial sectional view to enlarged scale taken through the shoe and the pipe on a plane perpendicular to the axis of the latter; and Fig. 4 is a side elevation of the shoe with a part in section.

Figure 1:
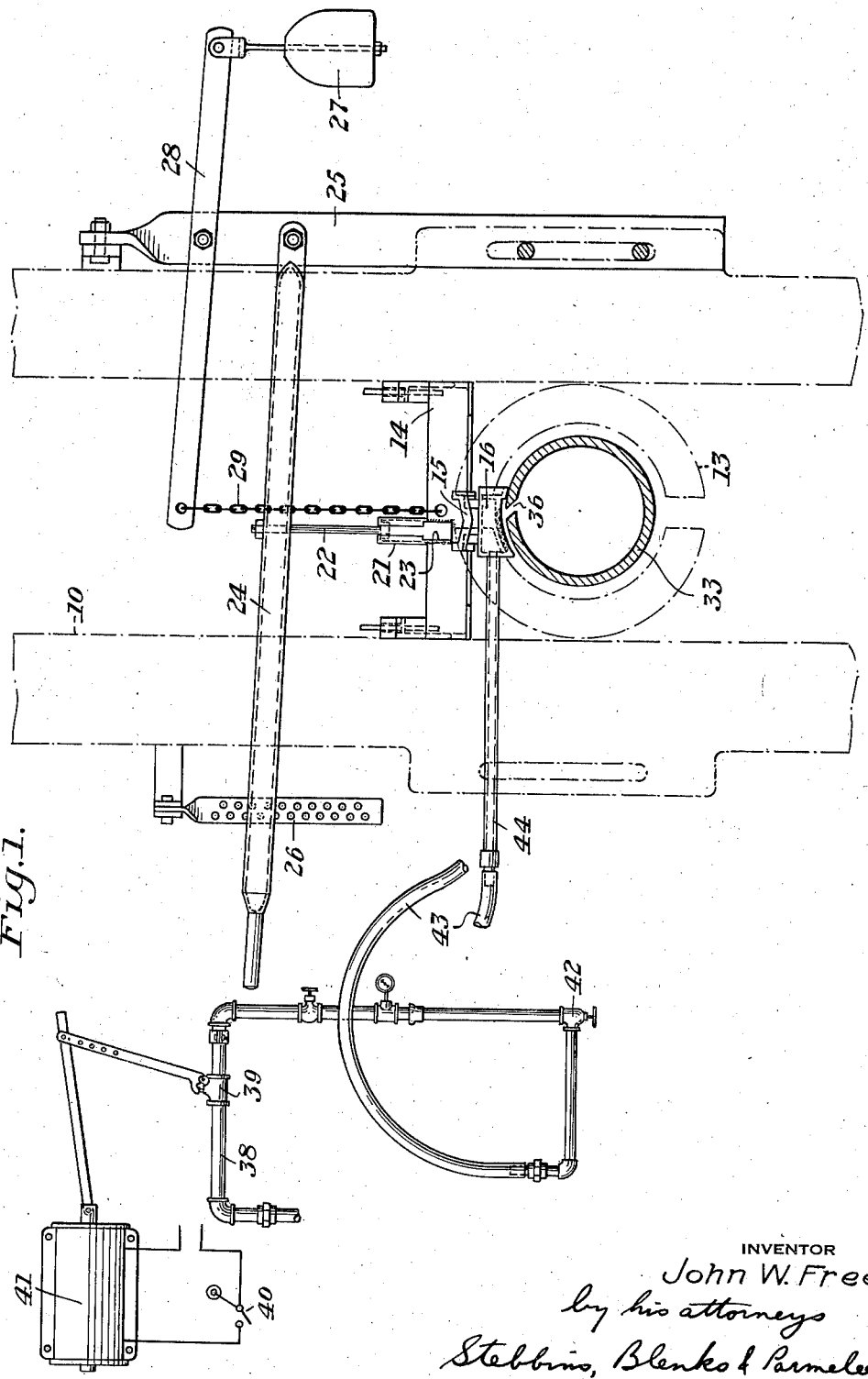

A welding stand of a lap-weld pipe mill usually comprises housings 10, horizontal grooved rolls 11, a ball 12 therebetween, and a bell guide 13 effective to guide formed skelp from the heating furnace between the rolls and onto the ball and its supporting mandrel whereby to weld the scarfed edges of the skelp to form a length of pipe.

The apparatus of my invention comprises a yoke 14 pivoted between the housings 10, having a tongue 15 projecting therefrom toward the entering side of the rolls, and a shoe 16 pivoted to the tongue. The sides of the yoke 14 have notches 17 therein which receive a cross bar 18 extending between the housings. Hooks 19 having shanks slidable through the sides of the yoke secure the latter on the cross bar, being fastened thereto by pins 20.

A socket 21 extends upwardly from the front of the yoke 14 for receiving the head of a hanger bolt 22, the socket having a vertical slot with an enlarged lower end 23 whereby the head of the bolt may be inserted. The bolt 22 passes through a tubular lever 24 pivoted on a bar 25 secured to one of the housings 10. The free end of the lever may be held in various adjusted positions by removable pins cooperating with a perforated bar 26 carried on the other housing. The weight of the yoke and shoe is balanced to some extent by a counterweight 27, a pivoted lever 28, and a chain 29 secured thereto and to the yoke.

The shoe 16 is pivotally mounted on the tongue 15 by means of a pin 30 and comprises a chamber 31, the lower wall 32 of which is curved to conform in some degree to the curvature of the skelp indicated at 33. The shoe has a heel 34 adapted to rest on the edge of the skelp.

The bottom wall 32 of the chamber 31 has perforations 35 distributed longitudinally and transversely thereof as shown. The perforations are formed so as to provide a plurality of jets of gas directed toward the seam cleft 36. The shoe 16 terminates in an upturned nose or point 37 whereby it rides up onto the advancing end of a skelp length approaching the welding stand.

Gas is supplied to the shoe 16 from any convenient source (not shown) through piping 38 and a valve 39. The valve may be remotely controlled as by a flag switch 40 actuated by the advancing skelp length, and a solenoid 41. The piping 38 includes a needle valve 42, a flexible section 43, and a connecting section 44 secured to the side wall of the shoe.

I preferably employ oxygen under a pressure of about 25 pounds per square inch, although the exact pressure may differ with various working conditions. It is preferable to subject the edges of the skelp to a gas blast sufficient to impinge strongly thereagainst, but too much or too little oxygen defeats the object thereof which is, of course, to raise edges to welding temperature just before the welding is effected.

The operation of the invention will doubtless be clear from the above description. In any event, the shoe 16 is normally tilted back (i. e. with its nose up), and is shifted to the position shown in Fig. 2 by the advancing skelp length. After engagement by the latter, the heel of the shoe rides thereon, supporting the shoe at the proper distance from the skelp. The lever 24 is preferably adjusted so that the shoe will be raised when engaged by the skelp. As a result, the head of the bolt 22, instead of engaging the upper end of the socket 21, is disposed midway thereof, because of the lost-motion linkage provided thereby which permits elevation of the shoe when engaged by the skelp.

The switch 40 is located so that the valve 39 will be operated as soon as the leading end of the skelp engages the shoe, insuring the delivery of a stream of gas progressively to the entire length of the skelp. By reason of the arrangement of the holes 35, the gas is discharged progressively on the skelp throughout an extended area measured along the seam edges as well as at right angles thereto, peripherally of the skelp. The needle valve 42 permits a nice control of the volume of gas discharged, and the desired setting of this valve may readily be determined by observation.

The apparatus may readily be set for various sizes of pipe by adjusting the lever 24 up or down. Fig. 2 illustrates the setting of the yoke 14 for two different sizes of pipe.

It will be apparent from the foregoing that the apparatus of my invention is simple, inexpensive, and easy to manipulate, being entirely automatic and requiring no attention during normal operation. The invention makes it possible to obtain a satisfactory weld without heating the skelp to temperatures as high as have been necessary heretofore. It also makes possible the welding of certain grades of steel which could not be welded under the ordinary practice. In addition, the welds made in accordance with the method are stronger than those obtained under conventional practice.

Although I have illustrated and described herein only the preferred embodiment and practice of the invention, it will be apparent that changes in the apparatus and procedure described and illustrated may be made within the scope of the following claims.

I claim:

1. The combination with a pipe welding mill including spaced housings and rolls journaled therein, of a yoke extending between said housings and inwardly toward said rolls, said yoke being pivoted to said housings, and a shoe pivoted to said yoke substantially centrally thereof and adapted to ride on formed skelp advancing toward said rolls, said shoe having ports for discharging jets of gas in a direction generally circumferentially of said skelp.

2. The combination with a pipe welding mill including spaced housings and rolls journaled therein, of a yoke extending between said housings and inwardly toward said rolls, said yoke being pivoted to said housings, and a shoe pivoted to said yoke substantially centrally thereof and adapted to ride on formed skelp advancing toward said rolls, said shoe having ports for discharging jets of gas in a direction generally circumferentially of said skelp and means for effecting angular adjustment of said yoke whereby to adjust said shoe vertically.

3. The combination with a pipe welding mill including spaced housings and rolls journaled therein, of a yoke extending between said housings and inwardly toward said rolls, said yoke being pivoted to said housings, and a shoe pivoted to said yoke substantially centrally thereof and adapted to ride on formed skelp advancing toward said rolls, said shoe having ports for discharging jets of gas in a direction generally circumferentially of said skelp, a suspension for said yoke including a lost motion linkage permitting said shoe to rise.

4. The combination with a pipe welding mill including spaced housings and rolls journaled therein, of a yoke extending between said housings and inwardly toward said rolls, said yoke being pivoted to said housings, and a shoe pivoted to said yoke substantially centrally thereof and adapted to ride on formed skelp advancing toward said rolls, said shoe having ports for discharging jets of gas in a direction generally circumferentially of said skelp, and a depending flange extending therealong adjacent the side thereof toward which said jets are directed, adapted to engage the skelp and confine the gas and maintain a pocket thereof adjacent the skelp.

5. Gas blast apparatus for use adjacent a pipe welding mill including a gas box having a wall curved in substantial conformity with the contour of the pipe being welded, angularly disposed ports in said wall adapted to form jets impinging circumferentially on said pipe, a gas-supply connection communicating with said box and means floatingly supporting said box for sliding engagement with skelp advancing to the mill.

6. Gas blast apparatus for use adjacent a pipe welding mill including a gas box having a wall curved in substantial conformity with the contour of the pipe being welded, angularly disposed ports in said wall adapted to form jets impinging circumferentially on said pipe, a gas-supply connection communicating with said box and means floatingly supporting said box for sliding engagement with skelp advancing to the mill, said means including a pivot transverse to the travel of the skelp whereby said box accommodates itself to irregularities in the skelp.

JOHN W. FREE.